（12）United States Patent
Homeyer

(10) Patent No.: US 9,046,002 B2
(45) Date of Patent: Jun. 2, 2015

(54) OIL SUPPLY SYSTEM FOR AN AIRCRAFT ENGINE

(75) Inventor: Christian Homeyer, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 14/002,893

(22) PCT Filed: Mar. 2, 2012

(86) PCT No.: PCT/EP2012/053634
§ 371 (c)(1),
(2), (4) Date: Oct. 16, 2013

(87) PCT Pub. No.: WO2012/117094
PCT Pub. Date: Sep. 7, 2012

(65) Prior Publication Data
US 2014/0026534 A1    Jan. 30, 2014

(30) Foreign Application Priority Data

Mar. 3, 2011   (DE) .......................... 10 2011 012 863

(51) Int. Cl.
*F01D 25/20*   (2006.01)
*F02C 7/06*   (2006.01)
(Continued)

(52) U.S. Cl.
CPC . *F01D 25/20* (2013.01); *F02C 7/06* (2013.01); *F05D 2260/98* (2013.01); *F01D 21/00* (2013.01); *F16N 7/40* (2013.01)

(58) Field of Classification Search
CPC ........... F01D 25/18; F01D 25/20; F02C 7/06; F05D 2260/98; F01M 1/02; F01M 1/16; F01M 1/18; F01M 1/20; F01M 2001/123

USPC .......... 60/39.08, 39.091; 184/6.11, 6.12, 6.13
See application file for complete search history.

(56) References Cited

U.S. PATENT DOCUMENTS 2,453,217 A * 11/1948 Gregg et al. ................. 184/6.13
2,991,845 A    7/1961 Scheffler
(Continued)

FOREIGN PATENT DOCUMENTS

DE    10 2006 057 202    6/2008

OTHER PUBLICATIONS

International Search Report and Written Opinion dated Jul. 10, 2012 from counterpart PCT/EP2012/053634.
(Continued)

*Primary Examiner* — Andrew Nguyen
(74) *Attorney, Agent, or Firm* — Timothy J. Klima; Shuttleworth & Ingersoll, PLC

(57) ABSTRACT

An oil supply system for an aircraft engine, includes at least one oil circuit including an oil tank having a closing valve associated with an outlet opening of the oil tank into a suction line, an oil pump, and at least one consumer to be supplied oil via a pressure line. A negative pressure relief line having a shut-off valve is connected to the suction line for ensuring pressure relief in the suction line after shutdown. Via a diaphragm volume flow limiter alternatively incorporated into the relief line, the suction line can also be connected permanently to the pressure line. A negative pressure occurring in the suction line after shutdown of the engine when the closing valve is closed and the plastic deformation of the suction line as well as a reduction of the pump suction capacity are thus avoided.

15 Claims, 1 Drawing Sheet

(51) Int. Cl.
*F01D 21/00* (2006.01)
*F16N 7/40* (2006.01)

(56) References Cited

U.S. PATENT DOCUMENTS

| | | | |
|---|---|---|---|
| 4,020,632 A * | 5/1977 | Coffinberry et al. | 60/773 |
| 4,529,061 A * | 7/1985 | Glasrud et al. | 184/103.1 |
| 4,905,644 A * | 3/1990 | Masclet | 123/196 A |
| 5,615,547 A * | 4/1997 | Beutin et al. | 60/39.08 |
| 5,685,396 A * | 11/1997 | Elkin et al. | 184/1.5 |
| 2008/0105493 A1 * | 5/2008 | Tumelty et al. | 184/6.22 |
| 2008/0196383 A1 | 8/2008 | Delaloye | |
| 2008/0264726 A1 * | 10/2008 | Cornet et al. | 184/6.11 |
| 2009/0078508 A1 * | 3/2009 | DeLaloye | 184/6.11 |
| 2009/0235630 A1 * | 9/2009 | Norris | 60/39.08 |
| 2010/0107603 A1 * | 5/2010 | Smith | 60/267 |

OTHER PUBLICATIONS

Translation of International Search Report dated Jul. 10, 2012 from counterpart application No. PCT/EP2012/053634.

* cited by examiner

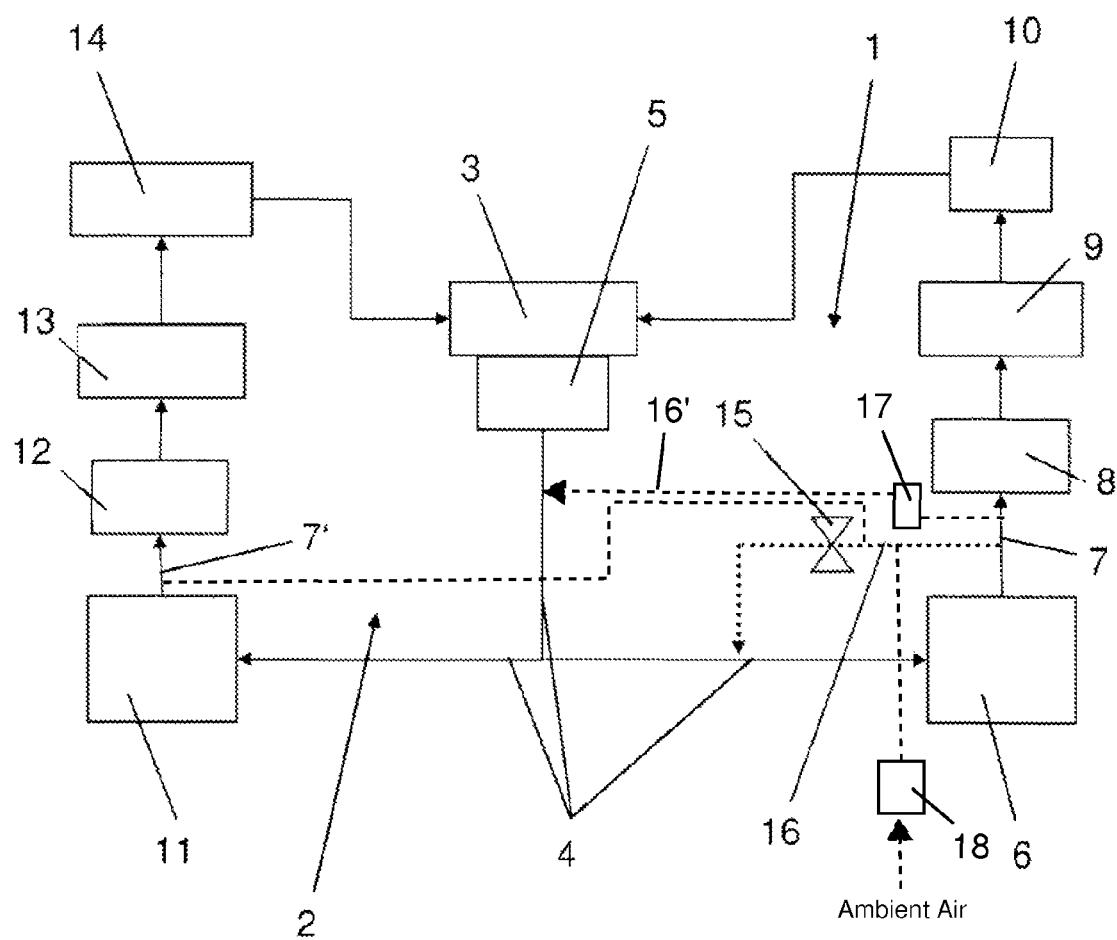

OIL SUPPLY SYSTEM FOR AN AIRCRAFT ENGINE

This application is the National Phase of International Application PCT/EP2012/053634 filed Mar. 2, 2012 which designated the U.S.

This application claims priority to German Patent Application No.DE102011012863.8 filed Mar. 3, 2011, which application is incorporated by reference herein.

This invention relates to an oil supply system for an aircraft engine, including at least one oil circuit, into which an oil tank having a closing valve associated with the outlet opening of the oil tank into a suction line, an oil pump and at least one consumer to be supplied with oil by means of a pressure line are integrated.

Gas-turbine engines are equipped with an oil system for lubrication, cooling and corrosion protection of gearboxes, bearings and shaft couplings. The oil can also be used as a sealant between rotating shafts. Turboprop engines have an additional oil system for supplying the highly stressed propeller gearbox and the propeller blade adjusting system. The oil is distributed via an oil circuit routed from an oil tank via a suction line and an oil pump plus a pressure line and the consumers back to the oil tank. In some engines, a closing valve is arranged at the exit side of the oil flowing from an oil tank into the suction line. The closing valve is kept open during engine operation—for example by the air pressure generated by the compressor. It is closed when the air pressure lessens due to a fall in compressor performance after shutdown of the engine, in order to thereby prevent emptying of the oil tank into lower-positioned components, for example the gearbox. The oil pumps generally driven by the compressor via a power take-off shaft remain however in operation during running down of the compressor shaft, i.e. when the oil tank is already sealed by means of the closing valve, and therefore intake from a closed suction line. The negative pressure thus produced in the suction line between the closing valve and the oil pump can be so great that the suction line is plastically deformed and the suction capacity of the oil pump during engine operation is impaired by a cross-sectional reduction caused by this.

The object underlying the present invention is to design an oil supply system for a gas-turbine engine in which the outlet opening of the oil tank integrated into the oil circuit is sealable by a closing valve after shutdown of the engine, so that a deformation of the suction line due to negative pressure is prevented.

It is a particular object of the present invention to provide solution to the above problems by an oil supply system designed in accordance with the features described herein.

Advantageous developments of the present invention will become apparent from the present description.

In an oil supply system for an aircraft engine including at least one oil circuit, into which an oil tank having a closing valve associated with the outlet opening of the oil tank into a suction line, an oil pump and at least one consumer to be supplied with oil by means of a pressure line are integrated, the general idea of the invention is the arrangement of a negative pressure relief line connected to the suction line, which ensures pressure relief in the suction line after shutdown of the engine and when the closing valve on the suction side of the oil tank is closed and the oil pump is still running. A deformation of the suction line and a resulting impairment of the pump suction capacity are avoided. A shut-off valve, which is incorporated into the negative pressure relief line connected to the pressure line of the oil circuit or the ambient air, opens at a certain negative pressure in the suction line. A volume flow limiter, for example in the form of a diaphragm, can be incorporated instead of the shut-off valve into the negative pressure relief line connected to the pressure line, said flow limiter permitting during operation of the engine a limited and harmless oil flow back into the suction line.

The invention is used for example in a turboprop engine with a turbomachine oil circuit and a propeller oil circuit, the suction lines of which are connected to a common oil tank, where the negative pressure relief line connected to the suction line is connected via the shut-off valve or the volume flow limiter to the pressure line of the turbomachine oil circuit or of the propeller oil circuit or can be connected to the ambient air exclusively via the shut-off valve.

An exemplary embodiment of the invention is explained in more detail on the basis of the drawing, the sole FIGURE of which shows a block diagram of an oil supply system including two separate oil circuits for a turboprop engine.

As the drawing shows, a common oil tank 3 having a closing valve 5 associated with its outlet opening to the suction lines 4 is integrated into a turbomachine oil circuit 1 and into a propeller oil circuit 2. The turbomachine oil circuit 1 is routed via a first oil pump 6 (turbomachine oil pump) and first oil filters 8 incorporated into its pressure line 7, first oil coolers 9 and the bearings and gearboxes of the turbomachine 10 back into the common oil tank 3. In the propeller oil circuit 2, the oil in the pressure line 7' extracted by means of the second oil pump 11 (propeller oil pump) passes via the second oil filter 12, the second oil cooler 13 and the propeller gearbox 14 back into the common oil tank 3. A negative pressure relief line 16 sealable by a valve 15 and connected to the pressure line 7 downstream of the first oil pump 6 issues into the suction line 4 upstream of the first oil pump 6. Instead of the valve 15, a diaphragm 17 can also be incorporated here into a negative pressure relief line 16', which is advantageous compared to the valve 15 in that no components are present that might fail.

As soon as the closing valve 5 closes after shutdown of the engine, but the oil pumps driven by the compressor of the engine are still running, suction takes place with the valve 15 opened by the negative pressure relief line 16 connected to the suction line 4—in this case connected to the pressure line 7—and hence the generation of a negative pressure in the suction line 4 and its plastic deformation, and ultimately an impairment of the pump suction capacity due to a reduced suction line cross-section, is prevented. During operation of the turbomachine 10, the valve 15 is closed, so that there is no connection to the pressure line 7 and no oil can pass from the pressure line 7 into the suction line 4. Via a—permanently open—diaphragm 17 incorporated instead of the valve 15 into the negative pressure relief line 16' a limited oil quantity passes from the pressure line 7 back into the suction line 4 during operation of the turbomachine 10. The diaphragm is however dimensioned such that the functioning of the oil supply system is assured and after shutdown of the turbomachine a sufficient pressure equalization is assured by the negative pressure relief line 16' open to the pressure line 7.

The negative pressure relief line 16 or 16' connected to the suction line 4 and provided with a valve or a diaphragm can also be connected to another oil pressure line, in this case the pressure line 7' connected to the second oil pump 11 in order to prevent any deformation of the suction line 4 after closing of the closing valve 5. In the same way, it is conceivable to connect the negative pressure relief line 16 connected to the suction line 4, after shutdown of the engine and closing of the closing valve 5, to the ambient air, if it is assured by a suitable valve 18 that no oil can leave the oil circuit.

LIST OF REFERENCE NUMERALS

1 Turbomachine oil circuit
2 Propeller oil circuit
3 Oil tank
4 Suction line
5 Closing valve of 3
6 First oil pump of 1
7 Pressure line of 1
7' Pressure line of 2
8 First oil filter
9 First oil cooler
10 Turbomachine
11 Second oil pump of 2
12 Second oil filter
13 Second oil cooler
14 Propeller gearbox
15 Shut-off valve
16 Negative pressure relief line

What is claimed is:

1. An oil supply system for an aircraft engine, comprising:
at least one closed oil circuit, including:
an oil tank having a closing valve associated with an outlet opening of the oil tank connecting to a suction line,
an oil pump,
at least one consumer of oil,
a pressure line supplying oil from the oil pump to the at least one consumer and from the at least one consumer to the oil tank,
a negative pressure relief line including a shut-off valve connected between the suction line and the pressure line, the shut-off valve being constructed and arranged to fluidly connect the pressure line to the suction line after shutdown of the engine and closing of the closing valve when a certain negative pressure is reached in the suction line to provide pressure relief to the suction line to reduce the negative pressure in the suction line.

2. The oil supply system in accordance with claim 1,
wherein the aircraft engine is a turboprop engine;
wherein the at least one oil circuit includes a turbomachine oil circuit and a propeller oil circuit,
wherein each of the turbomachine oil circuit and the propeller oil circuit is connected to an inlet side of the oil tank,
wherein the pressure line is a pressure line of the turbomachine oil circuit.

3. The oil supply system in accordance with claim 1,
wherein the aircraft engine is a turboprop engine;
wherein the at least one oil circuit includes a turbomachine oil circuit and a propeller oil circuit,
wherein each of the turbomachine oil circuit and the propeller oil circuit is connected to an inlet side of the oil tank,
wherein the pressure line is a pressure line of the propeller oil circuit.

4. An oil supply system for an aircraft engine, comprising:
at least one closed oil circuit, including:
an oil tank having a closing valve associated with an outlet opening of the oil tank connecting to a suction line,
an oil pump,
at least one consumer of oil,
a pressure line supplying oil from the oil pump to the at least one consumer and from the at least one consumer to the oil tank,
a negative pressure relief line including a volume flow limiter connected between the suction line and the pressure line, the volume flow limiter continually providing a limited fluid connection between the pressure line and the suction line to provide pressure relief to the suction line to reduce a negative pressure in the suction line caused by a closing of the closing valve while the oil pump is still supplying oil, wherein the at least one oil circuit includes a turbomachine oil circuit and a propeller oil circuit, and wherein each of the turbomachine oil circuit and the propeller oil circuit is connected to an inlet side of the oil tank.

5. The oil supply system in accordance with claim 4,
wherein the volume flow limiter is a diaphragm dimensioned such that during operation of the engine only a limited, permissible oil volume flow passes from the pressure line into the suction line.

6. The oil supply system in accordance with claim 5,
wherein the aircraft engine is a turboprop engine;
wherein the pressure line is a pressure line of the turbomachine oil circuit.

7. The oil supply system in accordance with claim 5
wherein the aircraft engine is a turboprop engine;
wherein the pressure line is a pressure line of the propeller oil circuit.

8. The oil supply system in accordance with claim 4,
wherein the aircraft engine is a turboprop engine;
wherein the pressure line is a pressure line of the turbomachine oil circuit.

9. The oil supply system in accordance with claim 4,
wherein the aircraft engine is a turboprop engine;
wherein the pressure line is a pressure line of the propeller oil circuit.

10. An oil supply system for an aircraft engine, comprising:
at least one closed oil circuit, including:
an oil tank having a closing valve associated with an outlet opening of the oil tank connecting to a suction line,
an oil pump,
at least one consumer of oil,
a pressure line supplying oil from the oil pump to the at least one consumer and from the at least one consumer to the oil tank,
a negative pressure relief line including a one-way valve connected between the suction line and an ambient air source, the one-way valve being constructed and arranged to fluidly connect the ambient air source to the suction line after shutdown of the engine to provide pressure relief to the suction line to reduce a negative pressure in the suction line caused by a closing of the closing valve while the oil pump is still supplying oil and while preventing escape of oil from the closed oil circuit.

11. The oil supply system in accordance with claim 10,
wherein the one-way valve is constructed and arranged to open after shut-down of the engine when a certain negative pressure is reached in the suction line.

12. The oil supply system in accordance with claim 11,
wherein the aircraft engine is a turboprop engine;
wherein the at least one oil circuit includes a turbomachine oil circuit and a propeller oil circuit,
wherein each of the turbomachine oil circuit and the propeller oil circuit is connected to an inlet side of the oil tank,
wherein the pressure line is a pressure line of the turbomachine oil circuit.

13. The oil supply system in accordance with claim 11,
wherein the aircraft engine is a turboprop engine;

wherein the at least one oil circuit includes a turbomachine oil circuit and a propeller oil circuit, wherein each of the turbomachine oil circuit and the propeller oil circuit is connected to an inlet side of the oil tank, wherein the pressure line is a pressure line of the propeller oil circuit.

14. The oil supply system in accordance with claim 10, wherein the aircraft engine is a turboprop engine;

wherein the at least one oil circuit includes a turbomachine oil circuit and a propeller oil circuit, wherein each of the turbomachine oil circuit and the propeller oil circuit is connected to an inlet side of the oil tank, wherein the pressure line is a pressure line of the turbomachine oil circuit.

15. The oil supply system in accordance with claim 10, wherein the aircraft engine is a turboprop engine;

wherein the at least one oil circuit includes a turbomachine oil circuit and a propeller oil circuit, wherein each of the turbomachine oil circuit and the propeller oil circuit is connected to an inlet side of the oil tank, wherein the pressure line is a pressure line of the propeller oil circuit.

\* \* \* \* \*